(12) United States Patent
Jiang et al.

(10) Patent No.: US 9,747,403 B2
(45) Date of Patent: Aug. 29, 2017

(54) POWER-AND-GROUND (PG) NETWORK CHARACTERIZATION AND DISTRIBUTED PG NETWORK CREATION FOR HIERARCHICAL CIRCUIT DESIGNS

(71) Applicant: Synopsys, Inc., Mountain View, CA (US)

(72) Inventors: Yi-Min Jiang, San Jose, CA (US); Xiang Qui, Mountain View, CA (US); Balkrishna R. Rashingkar, San Jose, CA (US); Yan Lin, Pleasanton, CA (US)

(73) Assignee: SYNOPSYS, INC., Mountain View, CA (US)

( * ) Notice: Subject to any disclaimer, the term of this patent is extended or adjusted under 35 U.S.C. 154(b) by 92 days.

(21) Appl. No.: 14/798,250

(22) Filed: Jul. 13, 2015

(65) Prior Publication Data

US 2017/0017746 A1 Jan. 19, 2017

(51) Int. Cl.
*H02J 7/00* (2006.01)
*G06F 17/50* (2006.01)

(52) U.S. Cl.
CPC .............................. *G06F 17/5072* (2013.01)

(58) Field of Classification Search
USPC ........................................................ 716/122
See application file for complete search history.

(56) References Cited

U.S. PATENT DOCUMENTS

| | | | | |
|---|---|---|---|---|
| 2006/0095874 A1* | 5/2006 | Jiang | ................... | G06F 17/5077 716/109 |
| 2008/0092099 A1* | 4/2008 | Lin | ...................... | G06F 17/5077 716/122 |
| 2010/0306720 A1* | 12/2010 | Pikus | ................... | G06F 17/5081 716/106 |
| 2011/0107283 A1* | 5/2011 | Oh | ....................... | G06F 17/5068 716/107 |
| 2014/0181773 A1* | 6/2014 | Peart | ................... | G06F 17/5072 716/120 |
| 2014/0189629 A1* | 7/2014 | Lin | ...................... | G06F 17/5077 716/127 |
| 2014/0337811 A1* | 11/2014 | Knapp | ................... | G06F 17/505 716/104 |

* cited by examiner

*Primary Examiner* — Mohammed Alam
(74) *Attorney, Agent, or Firm* — Park, Vaughan, Fleming & Dowler LLP; Laxman Sahasrabuddhe (57) ABSTRACT

A chip layout can include a top-level portion and a set of blocks. The power-and-ground (PG) network for the chip layout can be specified by a set of chip-level PG constraints that is defined using a PG constraint definition language. The set of chip-level PG constraints can be characterized into new sets of PG constraints that correspond to smaller regions of the chip layout, e.g., a set of top-level PG constraints that corresponds to the top-level portion, and a set of block-level PG constraints for each block in the set of blocks. The new sets of PG constraints can then be provided to one or more instances of a PG compiler that executes on one or more processors to create the PG network for the chip layout.

15 Claims, 11 Drawing Sheets

Set of via rules 252 via pat1 pat3 via1   #rule1
via pat2 pat3 via2   #rule2
via pat2 pat4 via3   #rule3
via pat1 pat4 nil   #rule4

POWER-AND-GROUND (PG) NETWORK CHARACTERIZATION AND DISTRIBUTED PG NETWORK CREATION FOR HIERARCHICAL CIRCUIT DESIGNS

TECHNICAL FIELD

This disclosure relates to electronic design automation (EDA). More specifically, this disclosure relates to PG network characterization and distributed PG network creation for hierarchical circuit designs.

BACKGROUND

Related Art

Power-and-ground (PG) networks refer to the networks in a chip layout that supply power and ground voltages to circuit elements. Conventional techniques typically create a PG network for the entire chip layout. However, due to the large size of today's chip layouts, creating PG networks for the entire chip layout can take considerable amount of time and resources.

Therefore, what are needed are systems and techniques for creating PG networks without the above-described problems.

SUMMARY

Some embodiments described herein provide systems and techniques for creating a PG network for a chip layout. The chip layout can include a top-level portion and a set of blocks, and the PG network for the chip layout can be specified by a set of chip-level PG constraints that is defined using a PG constraint definition language. The PG constraint definition language can be in human readable form and can be provided by a user, e.g., a circuit designer. During operation, the embodiments can determine a set of top-level PG constraints for creating a top-level PG network for the top-level portion of the chip layout based on the set of chip-level PG constraints, wherein the set of top-level PG constraints is defined using the PG constraint definition language. Next, for each block in the set of blocks, the embodiments can determine a set of block-level PG constraints based on the set of chip-level PG constraints, wherein the set of block-level PG constraints is defined using the PG constraint definition language. The embodiments can then create a PG network in the top-level portion based on the set of top-level PG constraints. Next, for each block in the set of blocks, the embodiments can create a PG network in the block based on the set of block-level PG constraints associated with the block.

In some embodiments, creating the PG network in the top-level portion and creating the PG network in each block in the set of blocks can comprise providing the set of top-level PG constraints and the set of block-level PG constraints associated with each block in the set of blocks to one or more instances of a PG compiler that execute on one or more processors in the computer. In some embodiments, the PG network in the top-level portion and PG networks in the set of blocks can be created concurrently by multiple instances of PG compilers.

In some embodiments, the set of chip-level PG constraints can comprise a set of PG network patterns defined using the PG constraint definition language, a set of instantiation areas defined using the PG constraint definition language, a set of blockage areas defined using the PG constraint definition language, and a set of via creation rules defined using the PG constraint definition language.

In some embodiments, determining the set of top-level PG constraints can comprise adding a blockage area constraint corresponding to each block in the set of blocks to the set of chip-level PG constraints, wherein each blockage area constraint that is added to the set of top-level PG constraints is defined using the PG constraint definition language.

In some embodiments, determining the set of block-level PG constraints for each block in the set of blocks can comprise: (1) computing an offset associated with the set of PG network patterns based on a location of the block in the chip layout; (2) removing instantiation areas from the set of instantiation areas that do not intersect with the block; (3) removing blockage areas from the set of blockage areas that do not intersect with the block; (4) redefining each remaining instantiation area in the set of instantiation areas to match an intersection area between the instantiation area and the block; and (5) redefining each remaining blockage area in the set of blockage areas to match an intersection area between the blockage area and the block.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the one or more inventions disclosed herein are not limited to the embodiments shown, but are to be accorded the widest scope consistent with the principles and features disclosed herein.

Overview of an Electronic Design Automation (EDA) Flow

An EDA flow can be used to create a circuit design. Once the circuit design is finalized, it can subsequently be provided to a semiconductor manufacturing facility to undergo fabrication, packaging, and assembly to produce integrated circuit chips. An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality that is desired to be implemented. These tools also enable circuit designers to perform what-if planning to refine functionality, check costs, etc. During logic design and functional verification, the HDL (hardware description language), e.g., SystemVerilog, code can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout (placement) and can be electrically coupled (routing). PG routing can take place during physical implementation.

During analysis and extraction, the circuit's functionality can be verified at a transistor level and parasitics can be extracted. During physical verification, the design can be checked to ensure correctness for manufacturing, electrical issues, lithographic issues, etc.

During resolution enhancement, geometric manipulations can be performed on the layout to improve manufacturability of the design. During mask data preparation, the circuit design can be taped-out to produce masks which are used during fabrication.

Creating a PG Network for a Chip Layout

Figure 1:
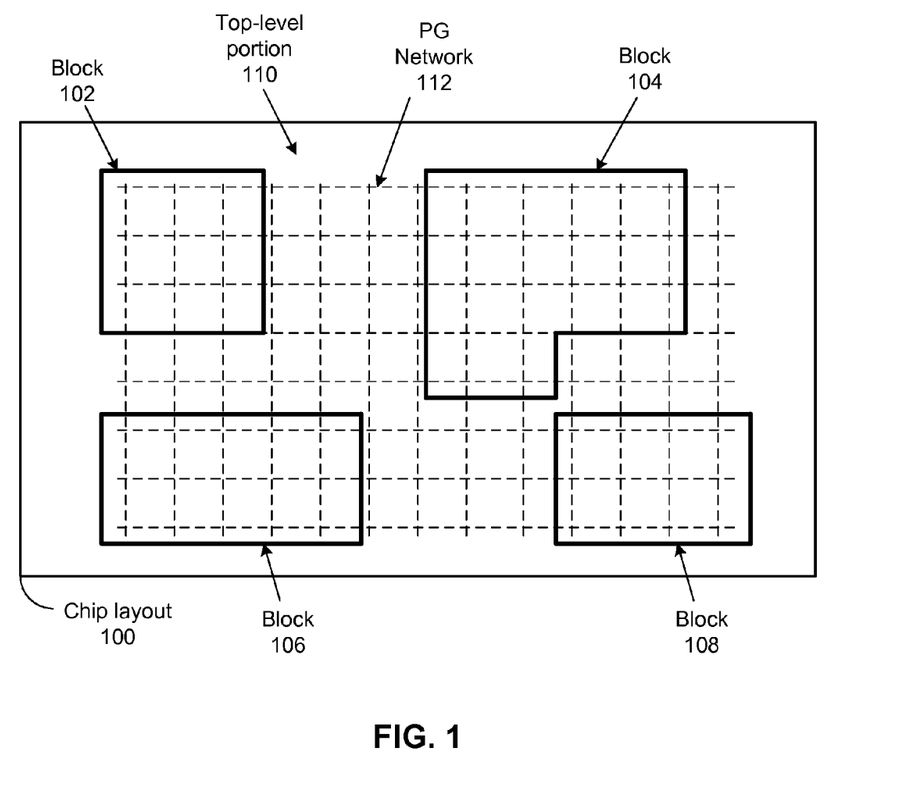
FIG. 1 illustrates a chip layout in accordance with some embodiments described herein.

FIG. 1 illustrates a chip layout in accordance with some embodiments described herein. Chip layout 100 can include a set of blocks, e.g., blocks 102, 104, 106, and 108. The circuitry in the chip layout that is outside these top-level blocks can be referred to as the top-level portion of the chip layout, e.g., top-level portion 110. PG network 112 for chip layout 100 can provide power and ground voltages to circuit elements in the top-level portion and the blocks. Conventional techniques typically create a PG network by individually creating and connecting a large number of wire segments for the entire circuit design. For example, a conventional technique may create a PG network by executing a script, wherein a wire segment in the PG network (e.g., the top horizontal wire in FIG. 1 that spans across blocks 102 and 104) corresponds to the execution of a corresponding line in the script. Due to the large size of today's chip layouts, creating PG networks for the entire chip layout can take considerable amount of time and resources.

In some embodiments described herein, the PG network is specified by a set of chip-level PG constraints that is defined by a user using a PG constraint definition language. Specifically, the set of chip-level PG constraints can comprise a set of PG network patterns defined using the PG constraint definition language, a set of instantiation areas defined using the PG constraint definition language, a set of blockage areas defined using the PG constraint definition language, and a set of via creation rules defined using the PG constraint definition language. This disclosure includes examples of PG constraints that are described using a particular PG constraint definition language. This PG constraint definition language has been used for illustration purposes only. The PG constraints presented in this disclosure are not intended to limit the embodiments to the forms disclosed.

A PG network pattern can be a hierarchical PG network pattern that combines a set of two or more PG network patterns. Specifically, the PG network pattern can be described using a PG constraint definition language that allows a user to define a PG network pattern in terms of other PG network patterns that are natively supported by the PG constraint definition language or that are defined elsewhere (e.g., either in the same file or in a different file). The set of natively supported PG network patterns can include a single line, a single segment, a line-and-space pattern, a ring pattern, macro/pad connection, standard cell rail, and/or any other PG network pattern that are desired to be natively supported in the PG constraint definition language.

An instantiation area can be an area in a chip layout where PG wires based on a given PG network pattern are to be instantiated. The instantiated PG wires may be assigned a net identifier that may also be specified with the instantiation area. An instantiation area can generally include a set of polygons in a given layer of the chip layout. A blockage area can be an area in the chip layout where the PG wires are not allowed to be instantiated.

Figure 2A:
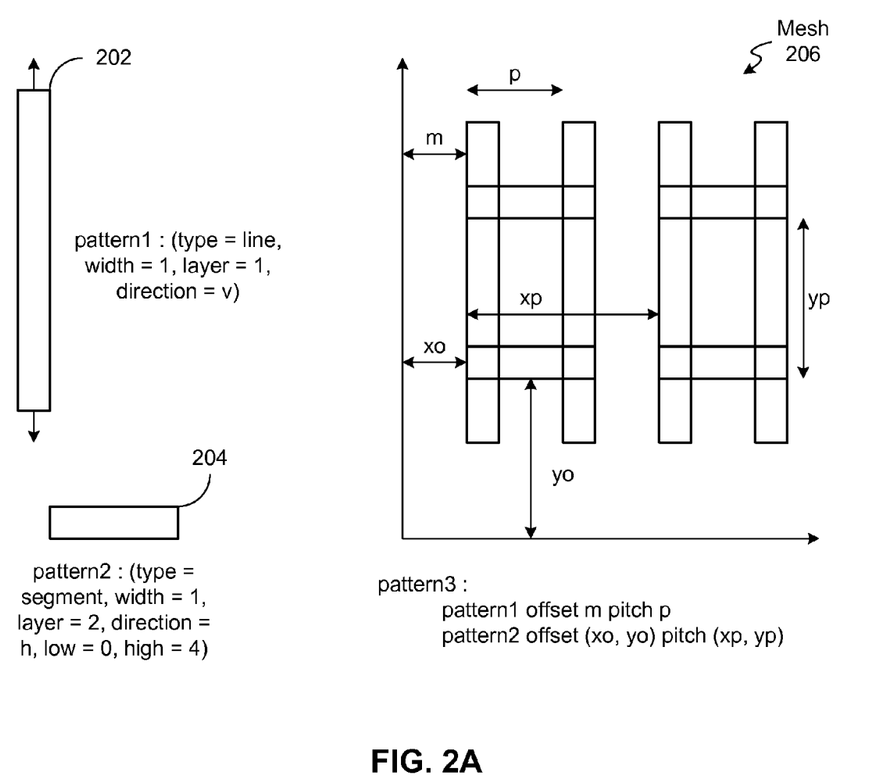
FIG. 2A illustrates examples of patterns in accordance with some embodiments described herein.

FIG. 2A illustrates examples of patterns in accordance with some embodiments described herein. The three pattern examples illustrated in FIG. 2A are called pattern1, pattern2, and pattern3. In FIG. 2A, patterns pattern1 and pattern2 are basic patterns, i.e., these patterns are natively supported in the pattern description language. Pattern pattern3, on the other hand, is a pattern that is defined in terms of patterns pattern1 and pattern2. Pattern pattern1 is a line with the following parameters: width=1, layer=1, and direction=v ("v" means "vertical"). As shown in FIG. 2A, pattern1 can be defined using the following statement in a PG constraint definition language: "pattern1:(type=line, width=1, layer=1, direction=v)." Since pattern1 extends indefinitely in the vertical direction (this is illustrated in FIG. 2A by the arrows that extend out from the top and bottom edges of rectangle 202), the endpoints or length of rectangle 202 in the vertical direction is not specified.

Pattern pattern2 is a segment that can be defined using the following statement in the PG constraint definition language: "pattern2:(type=segment, width=1, layer=2, direction=h, low=0, high=4)." Since pattern2 is a segment, the ends of the pattern (or alternatively the length) need to be specified. The "low" value specifies the location of the left edge of rectangle 204, and the "high" value specifies the location of the right edge of rectangle 204. The direction parameter is "h," which stands for "horizontal." Pattern pattern3 defines a mesh pattern (mesh 206 in FIG. 2A) by using the PG constraint definition language. As shown in FIG. 2A, the definition of pattern3 states that pattern3 is a combination of a repetition of pattern1 and a repetition of pattern2. The repetition of pattern1 begins at offset "m" and is repeated with pitch "p." The repetition of pattern2 begins at offset (xo, yo), and repeats with pitch "xp" in the horizontal direction and with pitch "yp" in the vertical direction. Since the lines corresponding to pattern1 extend indefinitely in the vertical direction, the offset and pitch in the vertical direction are not specified for pattern1.

The syntax and semantics of the PG network definition language shown in FIG. 2A is for illustration purposes only and is not intended to limit the embodiments to the forms disclosed. Many modifications and variations will be apparent to those skilled in the art.

Figure 2B:
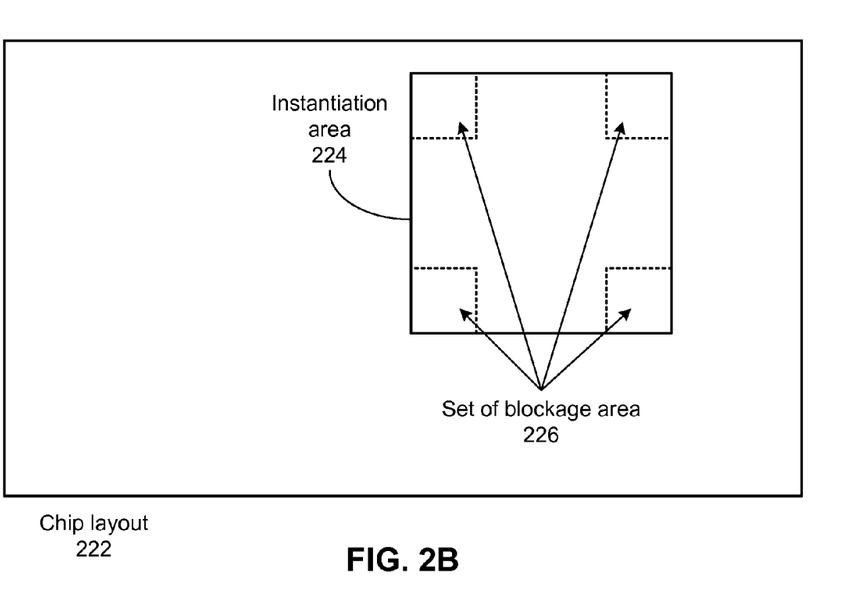
FIGS. 2B-2C illustrate a set of instantiation areas and blockage areas in accordance with some embodiments described herein.
Figure 2C:
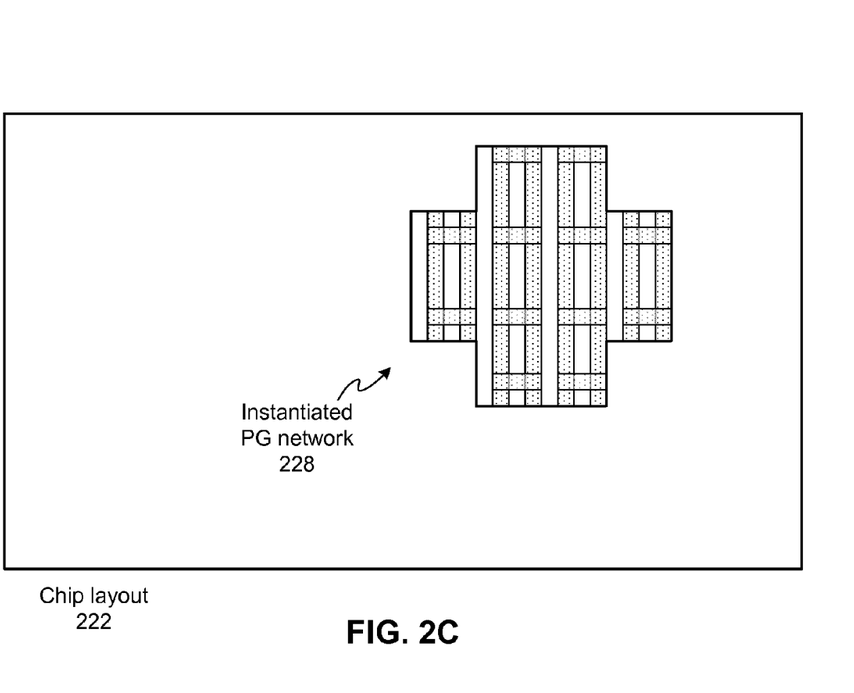

FIGS. 2B-2C illustrate a set of instantiation areas and blockage areas in accordance with some embodiments described herein. Instantiation area 224 can be defined using the PG network definition language, e.g., instantiation area 224 can be defined by specifying the location of two diagonally opposite corners of the rectangular area. An instantiation area can also be associated with one or more net identifiers that are to be assigned to the wires of the PG network that are instantiated in the instantiation area. Set of blockage areas 226 can also be defined using the PG network definition language, wherein set of blockage areas 226 are to be avoided while instantiating the PG network. Blockage areas can generally be located anywhere in chip layout 222, and a blockage area may apply to one or more layers.

Instantiated PG network 228 in FIG. 2C is obtained when pattern3 shown in FIG. 2A is instantiated in instantiation area 224 shown in FIG. 2B while avoiding set of blockage areas 226 shown in FIG. 2B. Note that pattern1 is on layer 1, and pattern2 is on layer 2. Therefore, the vertical lines in instantiated PG network 228 are on layer 1, and the horizontal segments in instantiated PG network 228 are on layer 2. In some embodiments, the set of PG network constraints can also specify how the wires in instantiated PG network 228 are to be extended. For example, the set of PG network constraints may specific that one or more wires are to be extended so that the wires electrically connect one or more objects in chip layout 222.

When different patterns are instantiated on different layers (e.g., pattern1 on metal layer M1, pattern2 on metal layer M2, etc.), vias may need to be created to electrically connect the different patterns. Some embodiments use a set of via creation rules to determine where and how to create vias. Specifically, instantiating vias can involve: (1) detecting an intersection between a first PG wire in a first metal layer and a second PG wire in a second metal layer, (2) selecting a via creation rule in the set of via creation rules based on a first PG network pattern that was used to create the first PG wire and a second PG network pattern that was used to create the second PG wire, and (3) instantiating a via in the chip layout at the intersection between the first PG wire and the second PG wire based on the via creation rule.

A via creation rule can be specified at the PG network pattern level (this type of via creation rule is called a "pattern-specific via creation rule" in this disclosure) or at the PG network pattern type level (this type of via creation rule is called a "pattern-type-specific via creation rule" in this disclosure). A pattern-specific via creation rule specifies creating a via at an intersection between two PG wires that were created based on two PG network patterns. A pattern-type-specific via creation rule specifies two PG network pattern types (e.g., pattern-type "line" and pattern-type "ring"), and is used to create a via at the intersection between two PG wires that were created by two patterns belonging to the two PG network pattern types.

Figure 2D:
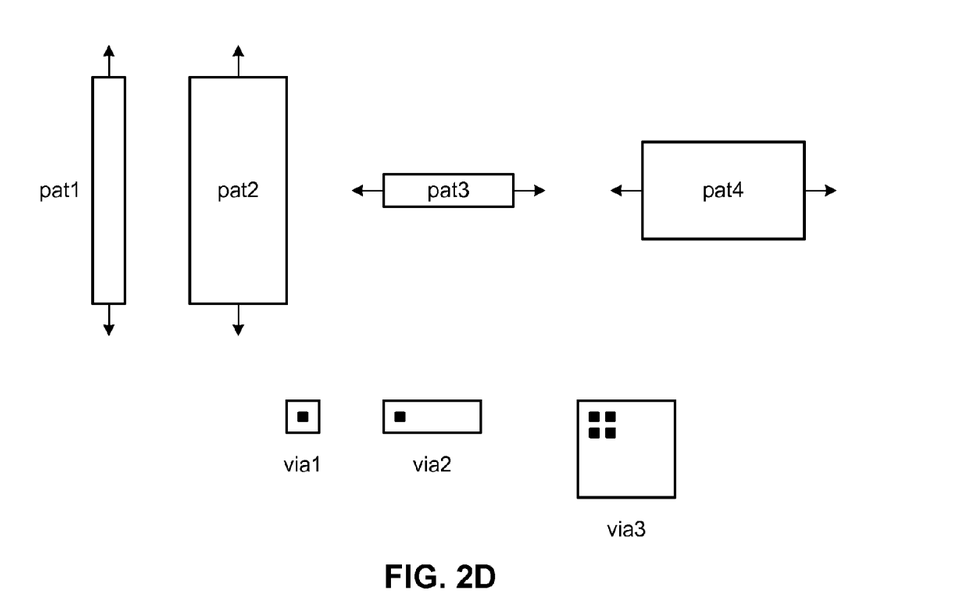
FIGS. 2D-2G illustrate how a set of via creation rules can be used to create vias in accordance with some embodiments described herein.
Figure 2E:
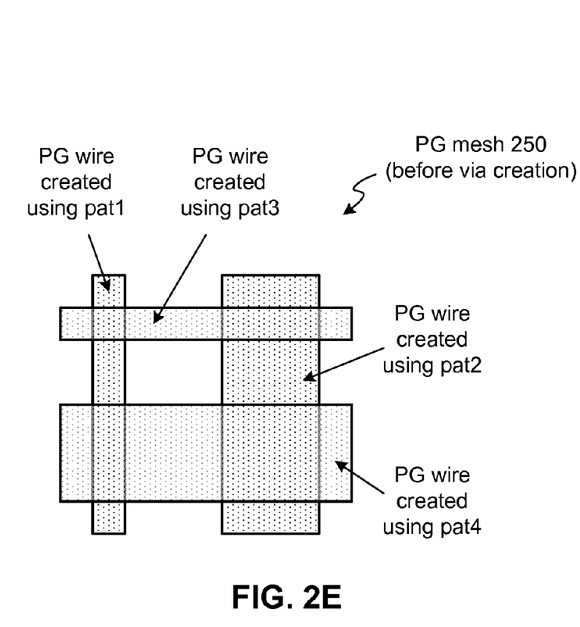
Figure 2F:
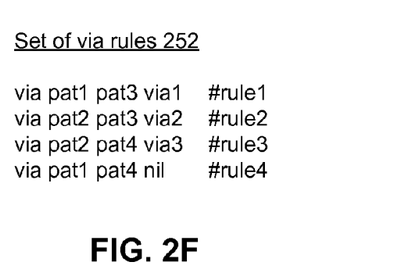
Figure 2G:
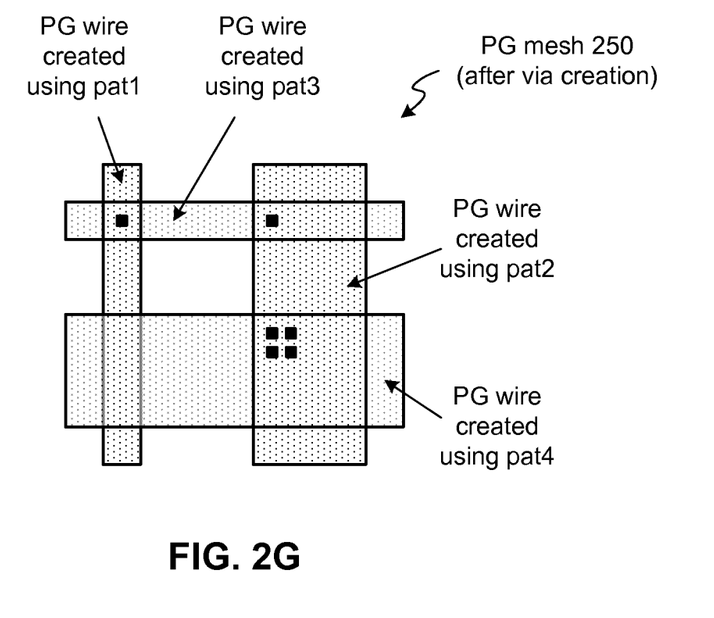

FIGS. 2D-2G illustrate how a set of via creation rules can be used to create vias in accordance with some embodiments described herein. FIG. 2D illustrates four different PG network patterns (pat1, pat2, pat3, and pat4) and three different vias (via1, via2, and via3). PG network patterns pat1 and pat2 are vertical lines on layer 1, wherein the width of pattern pat2 is greater than the width of pattern pat1. Patterns pat3 and pat4 are horizontal lines on layer 2, wherein the width of pattern pat4 is greater than the width of pattern pat3. As shown in FIG. 2D, a single via at the center of the intersecting region is created in via1, a single via on the left end of the intersecting region is created in via2, and a 2×2 via array at the top left corner of the intersecting region is created in via3. FIG. 2E illustrates a PG mesh pattern (PG mesh 250) that has been created using patterns pat1, pat2, pat3, and pat4. FIG. 2F illustrates set of via creation rules 252 that includes four via creation rules. Via creation rule "rule1" states that a via of type via1 is to be created when two PG wires created by patterns pat1 and pat3 intersect. Via creation rule "rule2" states that a via of type via2 is to be created when two PG wires created by patterns pat2 and pat3 intersect. Via creation rule "rule3" states that a via of type via3 is to be created when two PG wires created by patterns pat2 and pat4 intersect. Via creation rule "rule4" states that no vias are to be created when two PG wires created by patterns pat1 and pat4 intersect. FIG. 2G illustrates the result of applying set of via creation rules 252 to mesh 250.

Figure 3:
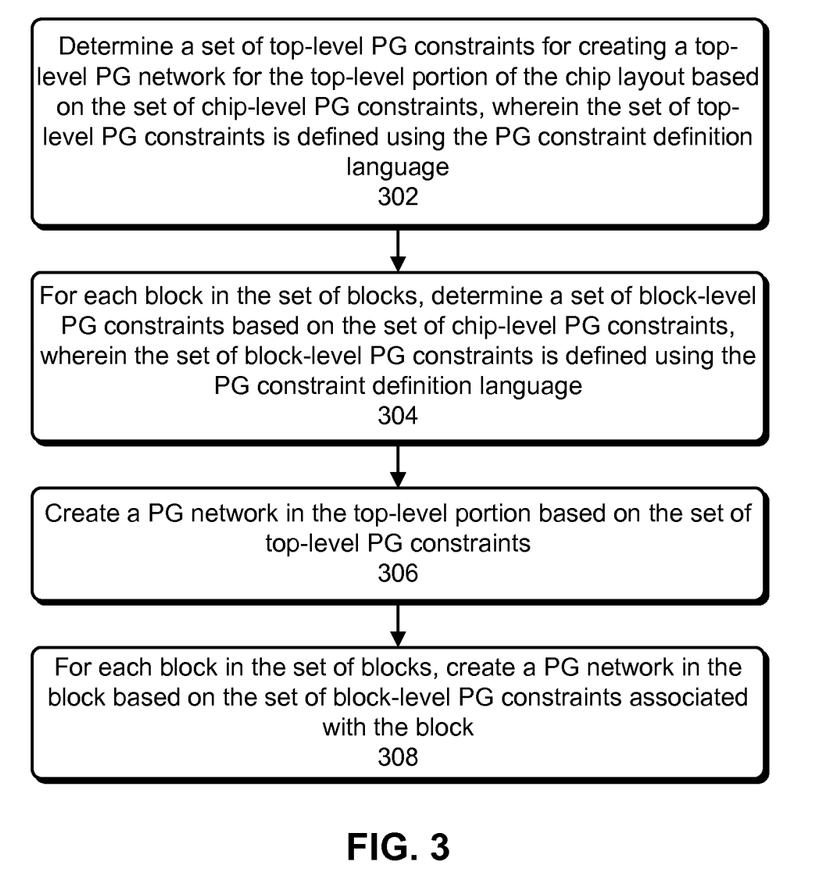
FIG. 3 presents a flowchart that illustrates a process for creating a PG network for a chip layout based on a set of chip-level PG constraints that is defined using a PG constraint definition language in accordance with some embodiments described herein.

FIG. 3 presents a flowchart that illustrates a process for creating a PG network for a chip layout based on a set of chip-level PG constraints that is defined using a PG constraint definition language in accordance with some embodiments described herein. The set of chip-level PG constraints can comprise a set of PG network patterns defined using the PG constraint definition language, a set of instantiation areas defined using the PG constraint definition language, a set of blockage areas defined using the PG constraint definition language, and a set of via creation rules defined using the PG constraint definition language.

The process can begin by determining a set of top-level PG constraints for creating a top-level PG network for the top-level portion of the chip layout based on the set of chip-level PG constraints, wherein the set of top-level PG constraints is defined using the PG constraint definition language (operation 302). In some embodiments, determining the set of top-level PG constraints can comprise adding a blockage area constraint corresponding to each block in the set of blocks to the set of chip-level PG constraints, wherein each blockage area constraint that is added to the set of top-level PG constraints is defined using the PG constraint definition language.

Figure 4A:
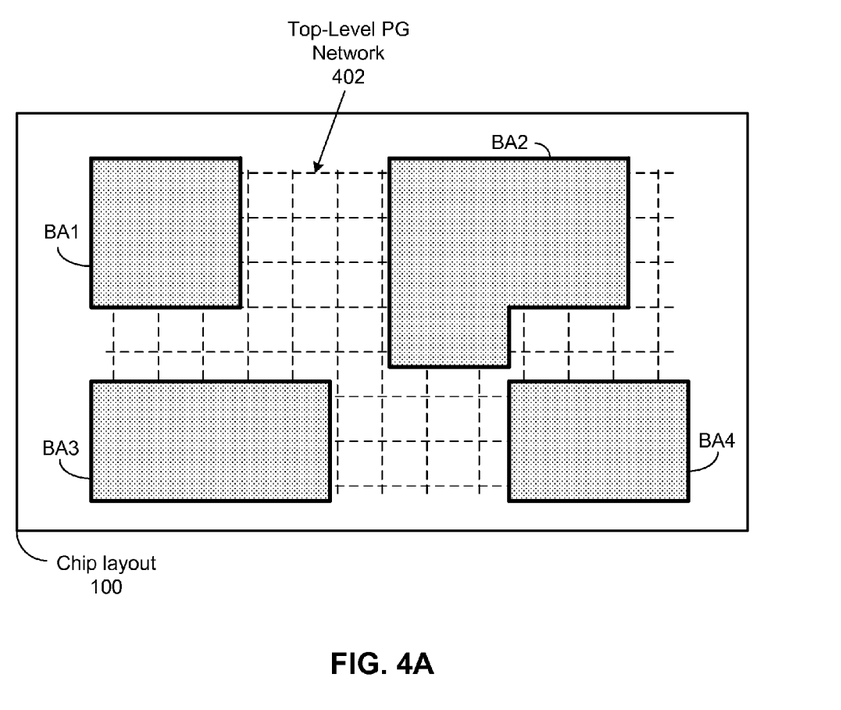
FIG. 4A illustrates an example of how a set of top-level PG constraints can be determined from a set of chip-level PG constraints in accordance with some embodiments described herein.

FIG. 4A illustrates an example of how a set of top-level PG constraints can be determined from a set of chip-level PG constraints in accordance with some embodiments described herein. Consider chip-layout 100 shown in FIG. 1. Suppose PG network 112 that covers entire chip layout 100 was created using a set of PG constraints. Then, a set of top-level PG constraints can be determined by adding a set of blockage areas BA1-BA4 to the set of chip-level PG constraints, wherein blockage areas BA1-BA4 correspond to blocks 102, 104, 106, and 108. Blockage areas BA1-BA4 are illustrated in FIG. 4A as shaded polygons. When a PG compiler compiles the set of top-level PG constraints, it creates top-level PG network 402 that does not include the PG network for the blocks. The term "PG compiler" generally refers to a software module that can create a PG network based on a set of PG constraints. The amount of time and resources required for creating top-level PG network 402 in FIG. 4A is substantially less than the amount of time and resources required for creating PG network 112 in FIG. 1 because top-level PG network 402 does not include the PG networks for the blocks.

Next, for each block in the set of blocks, the process can determine a set of block-level PG constraints based on the set of chip-level PG constraints, wherein the set of block-level PG constraints is defined using the PG constraint definition language (operation 304). In some embodiments, determining the set of block-level PG constraints for each block in the set of blocks can comprise: (1) computing an offset associated with the set of PG network patterns based on a location of the block in the chip layout; (2) removing instantiation areas from the set of instantiation areas that do not intersect with the block; (3) removing blockage areas from the set of blockage areas that do not intersect with the block; (4) redefining each remaining instantiation area in the set of instantiation areas to match an intersection area between the instantiation area and the block; and (5) redefining each remaining blockage area in the set of blockage areas to match an intersection area between the blockage area and the block.

Figure 4B:
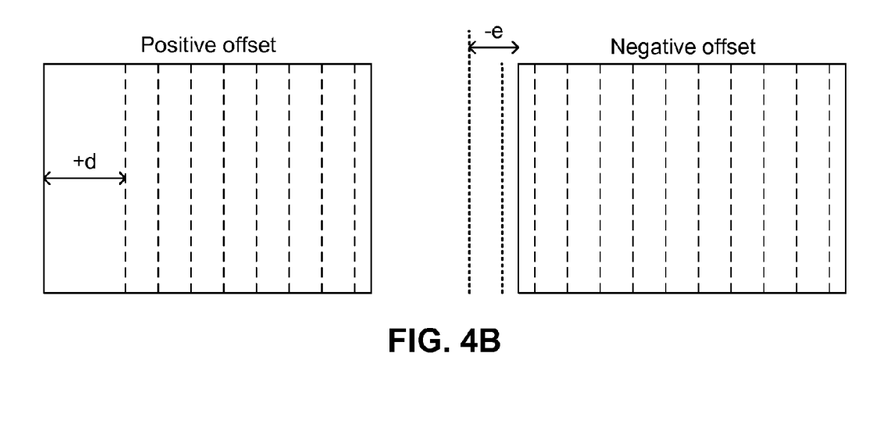
FIGS. 4B-4F illustrate how a set of block-level PG constraints can be determined based on a set of chip-level PG constraints in accordance with some embodiments described herein.

FIGS. 4B-4F illustrate how a set of block-level PG constraints can be determined based on a set of chip-level PG constraints in accordance with some embodiments described herein. FIG. 4B illustrates how positive and negative offsets can be applied to a PG network pattern. Let the rectangular boxes in FIG. 4B represent the boundary of a chip layout. Positive offset d (shown in the figure as "+d") can be specified for a PG network pattern in the X direction, thereby causing a PG compiler to begin creating the PG network pattern at a location that is d units to the right of the leftmost edge of the chip layout. Likewise, negative offset e (shown in the figure as "−e") can be specified for a PG network pattern in the X direction, thereby causing a PG compiler to begin creating the PG network pattern at a location that is e units to the left of the leftmost edge of the chip layout. Note that the two wires in the PG network pattern that are to the left of the leftmost edge of the chip layout are not created (this is illustrated in FIG. 4B by depicting the first two lines in the PG network pattern using dotted lines instead of dashed lines). Offsets in the Y direction can be specified similarly.

Figure 4C:
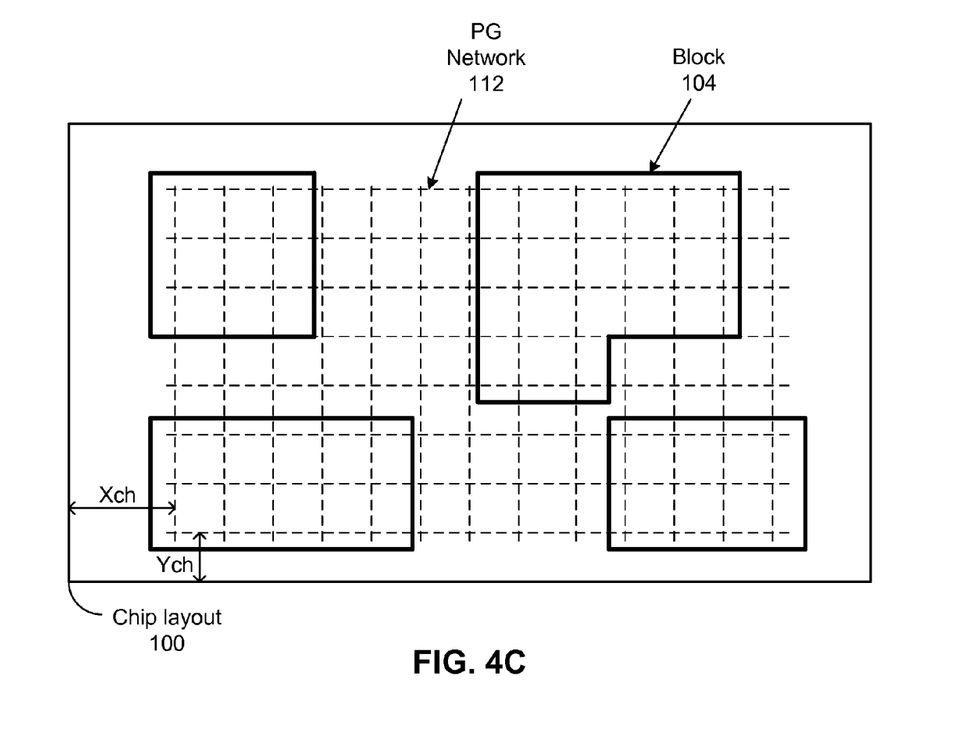
Figure 4D:
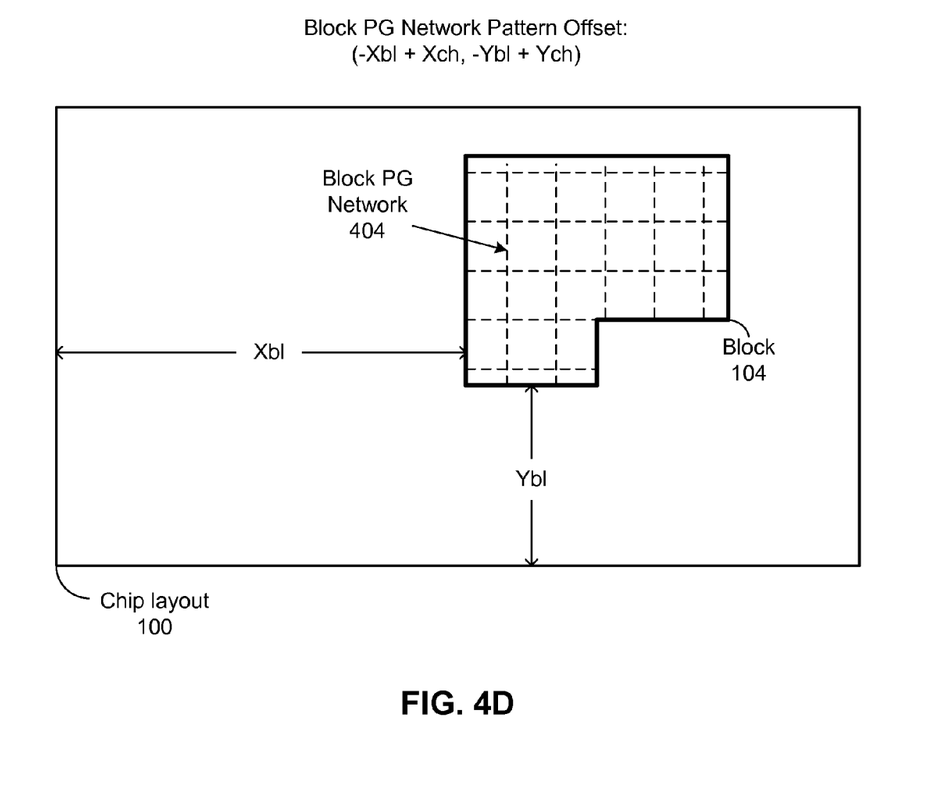

Based this offset convention, the PG network pattern shown in FIG. 4C begins at an offset (Xch, Ych) with respect to the bottom-left corner of chip layout 100. FIG. 4D illustrates that the bottom-left corner of block 104 is located at offset (Xbl, Ybl). Therefore, the offset for the grid within block 104 is (−Xbl+Xch, −Ybl+Ych). As shown in FIG. 4D, offset (−Xbl+Xch, −Ybl+Ych) can be used to create block PG network 404 within block 104. Note that block PG network 404 matches the portion of PG network 112 that was within block 104.

Figure 4E:
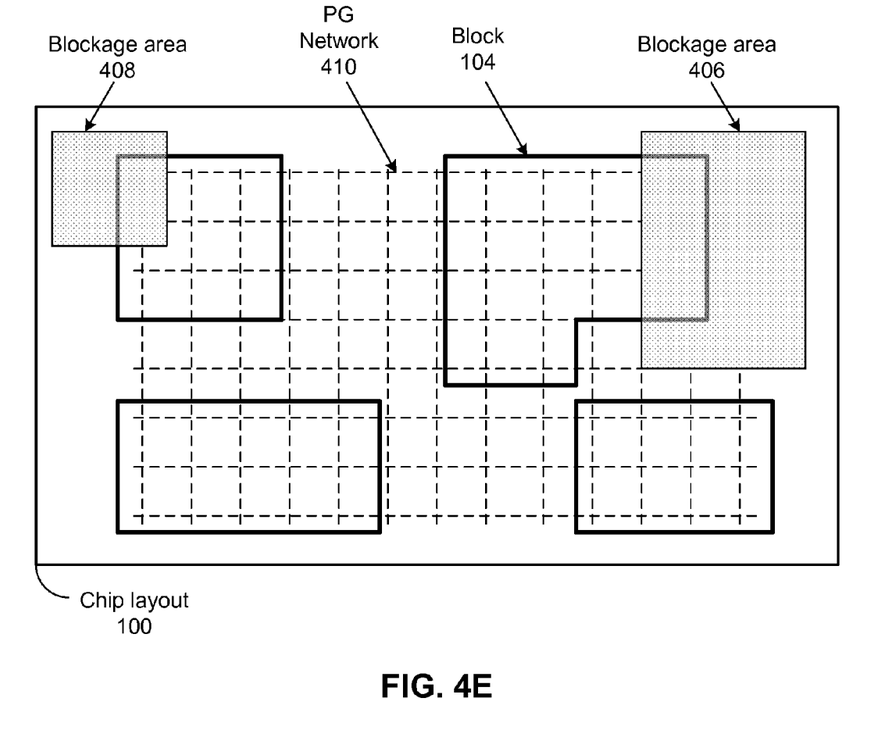
Figure 4F:
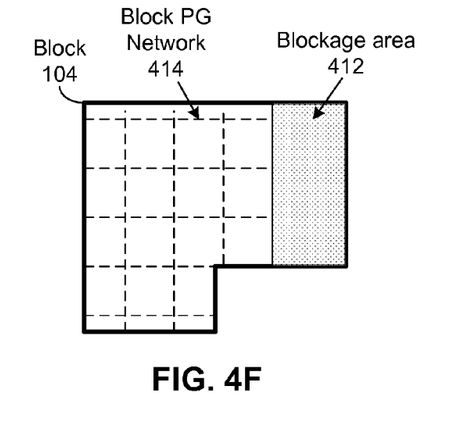

As shown in FIG. 4E, if the set of chip-level PG constraints included blockage areas 406 and 408, then PG network 410 that is created based on the set of chip-level PG constraints would not include wires in those blockage areas. FIG. 4F illustrates how blockage areas can be handled when determining a set of block-level PG constraints based on a set of chip-level PG constraints. Specifically, blockage area 408 can be removed because blockage area 408 does not intersect with block 104, and blockage area 412 (shown in FIG. 4F) can be added to the set of block-level PG constraints. Note that blockage area 412 matches the intersecting area between blockage 406 and block 104. Instantiation areas can be similarly handled when the set of block-level PG constraints are created based on the set of chip-level PG constraints.

Block PG network 414 can then be created based on offset (−Xbl+Xch, −Ybl+Ych) and blockage area 412. Note that block PG network 414 in FIG. 4F matches the portion of PG network 410 in FIG. 4E that was within block 104. The amount of time and resources required for creating block PG network 404 shown in FIG. 4D (or block PG network 414 shown in FIG. 4F) is substantially less than the amount of time and resources required for creating PG network 112 in FIG. 1 because block PG network 404 shown in FIG. 4D (or block PG network 414 shown in FIG. 4F) does not include the top-level PG network or PG networks for other blocks.

Referring back to FIG. 3, the process can then create a PG network in the top-level portion based on the set of top-level PG constraints (operation 306). Then, for each block in the set of blocks, the process can create a PG network in the block based on the set of block-level PG constraints associated with the block (operation 308).

In some embodiments, creating the PG network in the top-level portion and creating the PG network in each block in the set of blocks can comprise providing the set of top-level PG constraints and the set of block-level PG constraints associated with each block in the set of blocks to one or more instances of a PG compiler that execute on one or more processors in the computer. In some embodiments, a single instance of the PG compiler can be instantiated on a computer, and this single instance can execute on a single processing core or on multiple processing cores. In some embodiments, multiple instances can be instantiated on a single computer or on a distributed system (e.g., on a cloud computing platform), and the PG network in the top-level portion and PG networks in the set of blocks can be created concurrently by these multiple instances of PG compilers.

The embodiments disclosed herein for characterizing the PG constraints can generally be applied to any physical hierarchy level in a circuit design that has a multi-level physical hierarchy (i.e., blocks inside blocks). For example, suppose a block includes one or more sub-blocks. Then, the PG network within the block can be characterized into a set of top-level block PG constraints and a set of sub-block-level PG constraints. Specifically, if the bottom-left corner of a sub-block is located at an offset (Xsbl, Ysbl) with respect to the bottom-left corner of the chip layout, then the offset for the PG network pattern within the sub-block will be (−Xsbl+Xch, −Ysbl+Ych), and each sub-block will correspond to a blockage area within the block in the set of top-level block PG constraints. More generally, a set of PG constraints that applies to a given region of a chip-layout can be characterized into a set of top-level PG constraints for the top-level portion of the region, and a set of sub-region-level PG constraints for each sub-region within the region. As explained in reference to FIGS. 4A-4F, each sub-region will correspond to a blockage area in the set of top-level PG constraints for the top-level portion of the region, and each set of sub-region-level PG constraints can be determined by appropriately modifying offset values and removing or redefining instantiation areas and blockage areas.

It is important to note that embodiments described herein do not first create the entire PG network and then chop up the created PG network into smaller pieces. Instead, a set of chip-level PG constraints is characterized to obtain new sets of PG constraints (e.g., a set of top-level PG constraints, sets of block-level PG constraints, etc.) that correspond to smaller regions of the chip layout, and then the PG networks for each of the smaller regions is created based on the new sets of PG constraints. Note that the characterization process (i.e., the process of determining new sets of PG constraints that correspond to smaller regions of the chip layout) does not require a large amount of time or resources.

Embodiments described herein can substantially improve the performance of PG network creation. For example, some embodiments described herein resulted in a fourfold performance improvement when compared to a conventional PG network creation process for a chip layout that included more than four million cell instances, more than ten thousand wires, and approximately five million vias.

Computer System

Figure 5:
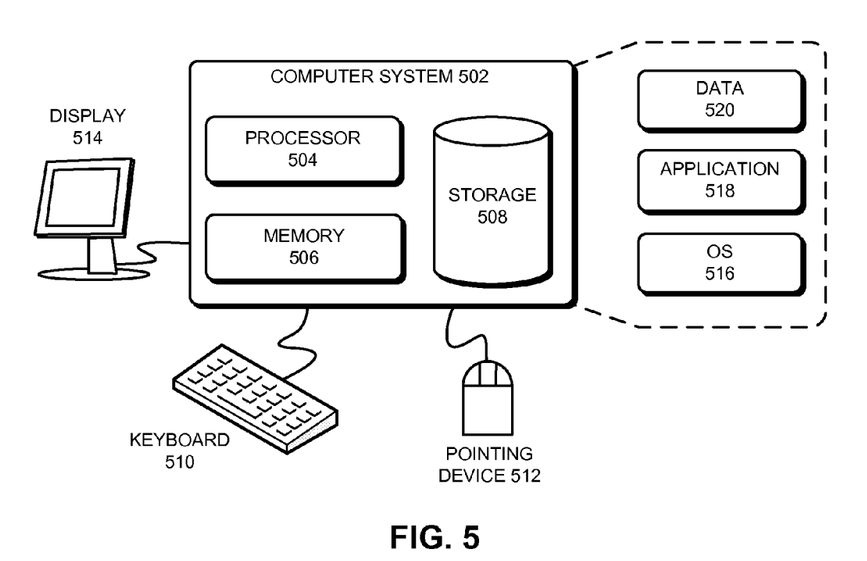
FIG. 5 illustrates a computer system in accordance with some embodiments described in this disclosure.

FIG. 5 illustrates a computer system in accordance with some embodiments described in this disclosure. Computer system 502 can include processor 504, memory 506, and storage device 508. Computer system 502 can be coupled to display device 514, keyboard 510, and pointing device 512. Storage device 508 can store operating system 516, application 518, and data 520. Data 520 can include input required by application 518 and/or output generated by application 518. Computer system 502 may automatically (or with user input) perform one or more processes that are implicitly or explicitly described in this disclosure. For example, computer system 502 can load application 518 into memory 506, and application 518 can then be used to create a PG for a chip layout based on a set of chip-level PG constraints. The computer system shown in FIG. 5 is for illustration purposes only and is not intended to limit the disclosure to the form disclosed.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. In an electronic design automation (EDA) software tool in a computer, a method for creating a power-and-ground (PG) network for a chip layout, wherein the chip layout includes a top-level portion and a set of blocks, wherein the PG network for the chip layout is specified by a set of chip-level PG constraints that is defined by a user using a PG constraint definition language, the method comprising:

the EDA software tool in the computer determining a set of top-level PG constraints for creating a top-level PG network for the top-level portion of the chip layout based on the set of chip-level PG constraints, wherein the set of top-level PG constraints is defined using the PG constraint definition language;

for each block in the set of blocks, the EDA software tool in the computer determining a set of block-level PG constraints based on the set of chip-level PG constraints, wherein the set of block-level PG constraints is defined using the PG constraint definition language;

the EDA software tool in the computer creating a PG network in the top-level portion based on the set of top-level PG constraints;

for each block in the set of blocks, the EDA software tool in the computer creating a PG network in the block based on the set of block-level PG constraints associated with the block; and wherein creating the PG network in the top-level portion and creating the PG network in each block in the set of blocks comprise providing the set of top-level PG constraints and the set of block-level PG constraints associated with each block in the set of blocks to one or more instances of a PG compiler that execute on one or more processors in the computer.

2. The method of claim 1, wherein the PG network in the top-level portion and PG networks in the set of blocks are created concurrently by multiple instances of PG compilers.

3. The method of claim 1, wherein the set of chip-level PG constraints comprises a set of PG network patterns defined using the PG constraint definition language, a set of instantiation areas defined using the PG constraint definition language, a set of blockage areas defined using the PG constraint definition language, and a set of via creation rules defined using the PG constraint definition language.

4. The method of claim 3, wherein determining the set of top-level PG constraints comprises adding a blockage area constraint corresponding to each block in the set of blocks to the set of chip-level PG constraints, wherein each blockage area constraint that is added to the set of top-level PG constraints is defined using the PG constraint definition language.

5. The method of claim 4, wherein determining the set of block-level PG constraints for each block in the set of blocks comprises:

computing an offset associated with the set of PG network patterns based on a location of the block in the chip layout;

removing instantiation areas from the set of instantiation areas that do not intersect with the block;

removing blockage areas from the set of blockage areas that do not intersect with the block;

redefining each remaining instantiation area in the set of instantiation areas to match an intersection area between the instantiation area and the block; and redefining each remaining blockage area in the set of blockage areas to match an intersection area between the blockage area and the block.

6. A non-transitory computer-readable storage medium storing instructions that, when executed by a computer, cause the computer to perform a method for creating a power-and-ground (PG) network for a chip layout, wherein the chip layout includes a top-level portion and a set of blocks, wherein the PG network for the chip layout is specified by a set of chip-level PG constraints that is defined by a user using a PG constraint definition language, the method comprising:

determining a set of top-level PG constraints for creating a top-level PG network for the top-level portion of the chip layout based on the set of chip-level PG constraints, wherein the set of top-level PG constraints is defined using the PG constraint definition language;

for each block in the set of blocks, determining a set of block-level PG constraints based on the set of chip-level PG constraints, wherein the set of block-level PG constraints is defined using the PG constraint definition language;

creating a PG network in the top-level portion based on the set of top-level PG constraints;

for each block in the set of blocks, creating a PG network in the block based on the set of block-level PG constraints associated with the block; and wherein creating the PG network in the top-level portion and creating the PG network in each block in the set of blocks comprise providing the set of top-level PG constraints and the set of block-level PG constraints associated with each block in the set of blocks to one or more instances of a PG compiler that execute on one or more processors in the computer.

7. The non-transitory computer-readable storage medium of claim 6, wherein the PG network in the top-level portion and PG networks in the set of blocks are created concurrently by multiple instances of PG compilers.

8. The non-transitory computer-readable storage medium of claim 6, wherein the set of chip-level PG constraints comprises a set of PG network patterns defined using the PG constraint definition language, a set of instantiation areas defined using the PG constraint definition language, a set of blockage areas defined using the PG constraint definition language, and a set of via creation rules defined using the PG constraint definition language.

9. The non-transitory computer-readable storage medium of claim 8, wherein determining the set of top-level PG constraints comprises adding a blockage area constraint corresponding to each block in the set of blocks to the set of chip-level PG constraints, wherein each blockage area constraint that is added to the set of top-level PG constraints is defined using the PG constraint definition language.

10. The non-transitory computer-readable storage medium of claim 9, wherein determining the set of block-level PG constraints for each block in the set of blocks comprises:

computing an offset associated with the set of PG network patterns based on a location of the block in the chip layout;

removing instantiation areas from the set of instantiation areas that do not intersect with the block;

removing blockage areas from the set of blockage areas that do not intersect with the block;

redefining each remaining instantiation area in the set of instantiation areas to match an intersection area between the instantiation area and the block; and redefining each remaining blockage area in the set of blockage areas to match an intersection area between the blockage area and the block.

11. An apparatus, comprising:

one or more processors; and a non-transitory computer-readable storage medium storing instructions that, when executed by the one or more processors, cause the apparatus to perform a method for creating a power-and-ground (PG) network for a chip layout, wherein the chip layout includes a top-level portion and a set of blocks, wherein the PG network for the chip layout is specified by a set of chip-level PG constraints that is defined by a user using a PG constraint definition language, the method comprising:

determining a set of top-level PG constraints for creating a top-level PG network for the top-level portion of the chip layout based on the set of chip-level PG constraints, wherein the set of top-level PG constraints is defined using the PG constraint definition language;

for each block in the set of blocks, determining a set of block-level PG constraints based on the set of chip-level PG constraints, wherein the set of block-level PG constraints is defined using the PG constraint definition language;

creating a PG network in the top-level portion based on the set of top-level PG constraints;

for each block in the set of blocks, creating a PG network in the block based on the set of block-level PG constraints associated with the block; and wherein creating the PG network in the top-level portion and creating the PG network in each block in the set of blocks comprise providing the set of top-level PG constraints and the set of block-level PG constraints associated with each block in the set of blocks to one or more instances of a PG compiler that execute on the one or more processors.

12. The apparatus of claim 11, wherein the PG network in the top-level portion and PG networks in the set of blocks are created concurrently by multiple instances of PG compilers.

13. The apparatus of claim 11, wherein the set of chip-level PG constraints comprises a set of PG network patterns defined using the PG constraint definition language, a set of instantiation areas defined using the PG constraint definition language, a set of blockage areas defined using the PG constraint definition language, and a set of via creation rules defined using the PG constraint definition language.

14. The apparatus of claim 13, wherein determining the set of top-level PG constraints comprises adding a blockage area constraint corresponding to each block in the set of blocks to the set of chip-level PG constraints, wherein each blockage area constraint that is added to the set of top-level PG constraints is defined using the PG constraint definition language.

15. The apparatus of claim 14, wherein determining the set of block-level PG constraints for each block in the set of blocks comprises:

computing an offset associated with the set of PG network patterns based on a location of the block in the chip layout;

removing instantiation areas from the set of instantiation areas that do not intersect with the block;

removing blockage areas from the set of blockage areas that do not intersect with the block;

redefining each remaining instantiation area in the set of instantiation areas to match an intersection area between the instantiation area and the block; and redefining each remaining blockage area in the set of blockage areas to match an intersection area between the blockage area and the block.

* * * * *

UNITED STATES PATENT AND TRADEMARK OFFICE
CERTIFICATE OF CORRECTION

PATENT NO. : 9,747,403 B2  
APPLICATION NO. : 14/798250  
DATED : August 29, 2017  
INVENTOR(S) : Yi-Min Jiang et al.

Page 1 of 1

It is certified that error appears in the above-identified patent and that said Letters Patent is hereby corrected as shown below:

On the Title Page

Item (72), the second named inventor's name is spelled incorrectly. Please change "Xiang Qui" to --Xiang Qiu--

Signed and Sealed this
Twenty-first Day of August, 2018

Andrei Iancu
*Director of the United States Patent and Trademark Office*